US 9,998,346 B2

(12) United States Patent
Thirumoorthy et al.

(10) Patent No.: US 9,998,346 B2
(45) Date of Patent: *Jun. 12, 2018

(54) FABRIC LATENCY DETERMINATION

(71) Applicant: Brocade Communications Systems, Inc., San Jose, CA (US)

(72) Inventors: Gokila Thirumoorthy, Milpitas, CA (US); Sathish Kumar Gnanasekaran, Sunnyvale, CA (US); Kumar Ghanta, San Jose, CA (US)

(73) Assignee: Brocade Communications Systems LLC, San Jose, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/274,184

(22) Filed: Sep. 23, 2016

(65) Prior Publication Data
US 2017/0093667 A1 Mar. 30, 2017

Related U.S. Application Data

(60) Provisional application No. 62/232,910, filed on Sep. 25, 2015.

(51) Int. Cl.
*H04L 12/26* (2006.01)
*G06F 13/40* (2006.01)
*H04L 29/08* (2006.01)

(52) U.S. Cl.
CPC ...... *H04L 43/0852* (2013.01); *G06F 13/4022* (2013.01); *G06F 13/4068* (2013.01); *H04L 43/106* (2013.01); *H04L 67/1095* (2013.01); *H04L 67/1097* (2013.01)

(58) Field of Classification Search
CPC .............................. H04L 43/08; H04L 43/106
See application file for complete search history.

(56) References Cited

U.S. PATENT DOCUMENTS

2014/0010096 A1* 1/2014 Kamble ................ H04L 49/354
370/252
2018/0006959 A1* 1/2018 Natu .................... H04L 47/2475

* cited by examiner

*Primary Examiner* — Shukri Taha
(74) *Attorney, Agent, or Firm* — Blank Rome, LLP

(57) ABSTRACT

An analytics and diagnostic node according to the present disclosure monitors oversubscription and determines flow metrics by receiving mirror command frames from one or more switching nodes. The mirror command frames could correspond to a multiple flows traversing over a connection within a network. The analytics and diagnostic node collects at least one latency metric for each of the flows using timestamps found within the mirror command frames. Based on the latency metrics and timestamps, the analytic diagnostic node determines an average data rate for each of the flows. The analytics and diagnostic node also computes the cumulative data rates corresponding to different bucket intervals based on the average data rates. To detect oversubscription, the analytics and diagnostic node compares the cumulative data rates with one or more oversubscription rules.

15 Claims, 8 Drawing Sheets

FABRIC LATENCY DETERMINATION

CROSS REFERENCE TO RELATED APPLICATIONS

This application claims the benefit under 35 U.S.C. § 119(e) of U.S. Provisional Patent Application Ser. No. 62/232,910 entitled "High Granularity Link Oversubscription Detection," filed Sep. 25, 2015, which is hereby incorporated by reference as if reproduced in its entirety.

This application is related to U.S. patent application Ser. No. 15/274,167 entitled "Command Response and Completion Determination" and U.S. patent application Ser. No. 15/273,968 entitled "High Granularity Link Oversubscription Detection," both of which are filed concurrently herewith and are hereby incorporated by reference as if reproduced in their entireties.

BACKGROUND OF THE DISCLOSURE

1. Field of the Disclosure

The present disclosure relates generally to managing bandwidth and/or data traffic for telecommunication and computing networks. Particularly, the present disclosure relates to detecting oversubscription and measuring latency for a network.

2. Description of the Related Art

Effectively deploying multiple devices in a network environment has become an increasingly complex task as transmission data rates, processing speeds, and storage capacities continue to increase. For instance, storage area networks (SANs) are specialized high-speed networks or subnetworks, referred to as fabrics that connect computer systems, control software, and/or storage devices over the fabric. SANs, as specialized high-speed networks or subnetworks, interconnect and share a group of storage devices with one or more servers and/or hosts. To access the storage devices, a server and/or host sends out block level access requests, rather than file-level access, to one or more storage devices within the pool of storage devices. Thus, by using SANs, each of the servers and/or hosts may access the shared pools of storage devices as if they are locally attached to the server.

Data rates and throughput of SAN switches, such as a Fibre Channel (FC) switches, also continue to improve. SANs are generally configured such that a single device, such as a server or a host, is connected to a single switch port. Currently, SAN switches are configured to commonly support data rates up to 16 gigabits per second (Gbps) and in some instances up to 32 Gbps. However, even with improvements in SAN data rates, SANs may still encounter performance issues for a variety reasons. For example, servers or hosts typically include multiple computing systems, such as virtual machines (VMs), that could complicate data processing and data transfers that eventually result in device slowdowns and/or back pressure. Additionally, most SANs generally have multiple flows traversing over a single link and/or multiple network flows from multiple devices (e.g., hosts) to a single storage device that could cause bottlenecks at several different points within the SANs.

Situations where multiple devices compete for a link's bandwidth often result in poor response times and other performance related issues. For instance, performance and stability issues can arise when hosts and/or storage devices accept frames at a rate lower than an expected offered rate. Accepting frames slower than the expected offered rate can create backups in the fabric that cause multiple unrelated flows to have input/output (I/O) failures or performance drops. In particular, the performance and stability issues can occur when hosts and/or storage devices send more traffic than the capacity and/or speed of the link can handle. For example, hosts can request (e.g., transmit read instructions) more data from multiple storage devices than a switch's and/or a host's port speed. Alternatively, multiple hosts in combination could transmit more data (e.g., write commands) to a storage device than a switch's and/or a storage device's port speed. Unfortunately, accurately detecting when oversubscription can cause performance and/or stability issues may be difficult because oversubscription in a network can occur in and/or for a relatively short time period and different devices (e.g., servers and/or storage devices) possibly have different I/O sizes and response times.

SUMMARY OF THE DISCLOSURE

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

According to the embodiments of the present disclosure, an analytics and diagnostic node monitors one or more flows within one or more fabric networks in real-time by receiving mirror command frames (e.g., read command frames) from one or more monitored switches. For each monitored flow, the analytics and diagnostic node monitors one or more network ports and/or links to determine times corresponding to one or more command frames and one or more latency metrics (e.g., fabric latency). The analytics and diagnostic node also determines the number of data frames (e.g., non-command frames) transported over the network ports and/or the links for each monitored flow over a specified time period. Afterwards, the analytics and diagnostic node uses the number of transmitted data frames and the latency metrics to determine an average data rate for each monitored flow. By determining the average data rate, a cumulative data rate for all of the monitored flows can be calculated over a time period. If the cumulative data rate exceeds a designated threshold level, such as the line rate of the corresponding link, the analytics and diagnostic node indicates (e.g., generate a flag) an oversubscription occurrence.

In one embodiment, the analytics and diagnostic node is configured to compute a variety of latency metrics that include initiator exchange completion time, target exchange completion time, an initiator first response latency time, and the target first response latency time. Based on the initiator exchange completion time and the target completion time, the analytics and diagnostic node is able to determine an exchange completion fabric latency. The analytics and diagnostic node is also able to determine a fabric first response latency time based on the initiator first response latency time and the target first response latency time. The analytics and diagnostic node uses the different latency metrics to identify device failures and/or fabric failures. The analytics and diagnostic node is also able to determine latency metrics, such as command frame latency, first response frame latency, and status frame latency when the monitored switches are time synchronized.

BRIEF DESCRIPTION OF THE FIGURES

The present disclosure has other advantages and features which will be more readily apparent from the following detailed description of the disclosure and the appended claims, when taken in conjunction with the accompanying drawings, in which:

DETAILED DESCRIPTION OF THE PREFERRED EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Figure 1:
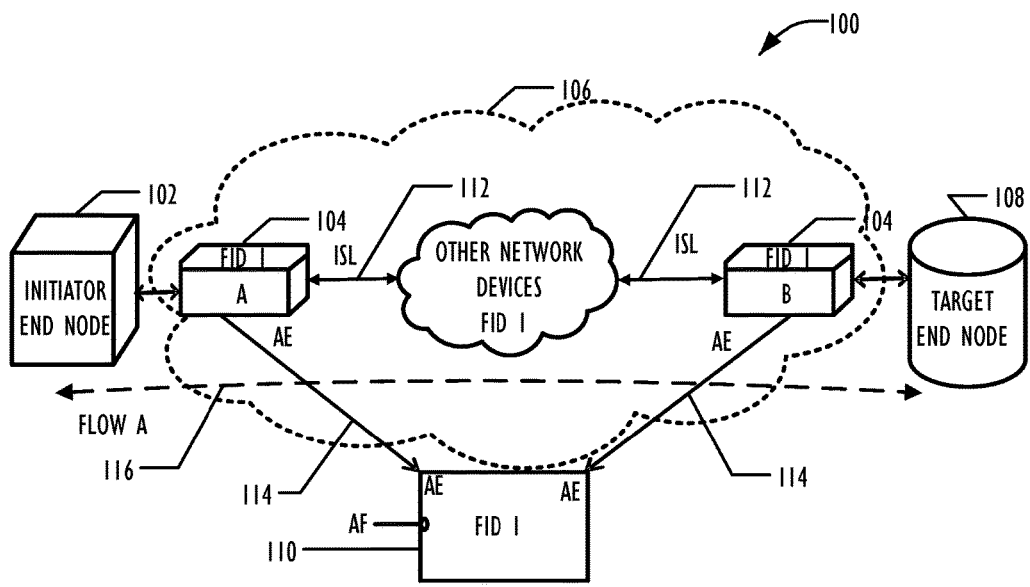
FIG. 1 is a schematic diagram of an embodiment of a single fabric network where embodiments of the present disclosure may operate herewith.

FIG. 1 is a schematic diagram of an embodiment of a single fabric network 100 where embodiments of the present disclosure may operate herewith. FIG. 1 illustrates that an initiator end node 102 is connected to an edge switch A 104 and a target end node 108 is connected to an edge switch B 104. As shown in FIG. 1, initiator end node 102 and target end node 108 are both assigned to fabric 106. Edge switches A and B 104 are interconnected to fabric A 106 via inter switch links (ISLs) 112. The initiator end node 102, edge switches A and B 104, and target end node 108 are part of a flow A 116 that transports data frames, such as command frames and normal data traffic, between the initiator end node 102 and target end node 108. Edge switches A and B 104 are also be connected to an analytics and diagnostic node 110 via analytic switch links (ASLs) 114 and analytic expansion (AE) ports. The analytics and diagnostic node 110 comprises an analytic fabric (AF) port that configures the analytics and diagnostic node 110 to receive mirror command traffic for computing a variety of flow metrics and monitor oversubscription. The AE ports and AF ports will be discussed in more detail in FIG. 4. Although FIG. 1 illustrates that the single fabric network too includes two monitored switches (edge switches A and B 104), other embodiments may have one or more than two monitored switches for flow A 116.

In FIG. 1, the initiator end node 102 may represent a server, a host, a virtual machine (VM), a container, and/or any other type of computing system that originates and receives data to and from the single fabric network 100. For example, the initiator end node 102 is a host that comprises a plurality of VMs, each with its own operating system (OS) and/or other applications. As a host, the initiator end node 102 comprises a host bus adapter (HBA) that provides I/O processing and connectivity to the single fabric network 100. In one embodiment, the HBA is configured to support data rates up to about 16 Gbps and/or about 32 Gbps. The host also includes a plurality of drivers to interface with the HBA and other host components, such as VMs and/or other applications.

The target end node 108 may be any computing device that originates and receives data to and from the single fabric network 100. In one embodiment, the target end node 108 is a remote storage device that is physically removed from the initiator end node 102. For example, the target end node 108 is a SAN storage device that provides block-level storage where applications running on the initiator end node 102 are able to access the target end node 108. Examples of SAN storage devices include, but are not limited to, tape libraries and disk-based devices, such as redundant array of independent disks (RAID) hardware devices that are logically separated into logical units where each logical unit is assigned a logical unit number (LUN). Other examples of SAN storage devices include storage devices labeled as "just a bunch of disks" (JBOD) device, where each individual disks is a logical unit that is assigned a logical unit number.

Is FIG. 1, fabric A 106 comprises a plurality of network switches that forward data traffic. For example, the network switches in fabric A 106 and edge switches A and B 104 are SAN switches that transport data over the single fabric network too. The SAN switches may utilize one or more communication protocols to transport data over the single fabric network too. In one embodiment, the SAN switches utilize the FC protocol as the transport protocol, where Small Computer System Interface (SCSI) commands are transported over the single fabric network 100. One or more of other network devices in fabric A 106 could be substantially similar to edge switches A and B 104 and act as monitored switches that communicate with the analytics and diagnostic node 110.

As shown in FIG. 1, fabric A 106 and edge switches A and B 104 are all part of the same fabric network and assigned a fabric identifier (FID) of FID 1. FIG. 1 also illustrates that the analytics and diagnostic node 110 is attached to the same fabric network (e.g., FID 1) as the network switches in fabric A 106 and edge switches A and B 104. In other embodiments, the analytics and diagnostic node 110 is partitioned into a plurality of virtual analytics platform instances, where each virtual analytics platform instance monitors different fabric networks that are assigned a different fabric identifier (e.g., FID 2). Monitoring different fabric networks using multiple virtual analytics platform instances are discussed in more detail in FIG. 3.

The analytics and diagnostic node 110 is configured to provide I/O analysis and perform behavioral monitoring to predict performance and deliver operational stability for a network. The analytics and diagnostic node 110 is able to identify root causes of network performance issues (e.g., performance slowdowns), such as identifying whether the performance issue originates with an end node or within the fabric. In addition, the analytics and diagnostic node 110 minimizes impact on the fabric and/or end node when accessing real-time fabric traffic to determine flow metrics for I/O analysis. Using FIG. 1 as an example, the analytics and diagnostic node 110 can avoid causing latency and/or degradation of the link quality when accessing real-time fabric. The analytics and diagnostic node 110 is also able to minimize the impact of additional load on the central processing unit (CPU) for edge switches A and B 104 and/or any other monitored switch within fabric A 106. Examples of network capabilities the analytics and diagnostic node 110 allow a network administrator to have access to include, but are not limited to, visibility into storage device utilization, device latency metrics, device performance metrics, monitoring at both the initiator end node port and the target end node port, bi-directional average and maximum latency metrics, and/or oversubscription statistics and resource contention.

To provide network administrators with enhanced network visibility, the analytics and diagnostic node 110 is configured with at least one AF port for receiving mirror command frames from the edge switches A and B 104 and/or other monitored switches. Command frames are generally referred to within this disclosure as any type of frame that requests a target end node 108 to perform a service. Command frames are typically different from normal data traffic transported over a fabric and can be filtered from normal data traffic. Examples of command frames include, but are not limited to, read commands, write commands, inquiry commands, request sense commands, test unit ready commands, reserve commands, and/or release commands. In FIG. 1, for flow A 116, edge switches A and B 104 in fabric A 106 forward mirror command frames to the analytics and diagnostic node 110 to obtain latency metrics and to detect for oversubscription. Generating and routing mirror frames is discussed in more detail in U.S. Pat. No. 8,996,720, filed Mar. 16, 2010, by Satsheel Bhasker Altekar et al., and entitled "Method and Apparatus for Mirroring Frames to a Remote Diagnostic System," which is hereby incorporated by reference as if reproduced in its entirety. To measure latency and to detect for oversubscription, the mirror command frames include a timestamp that indicate the time of when the edge switches A or B 104 provide mirror command frames to the analytics and diagnostic node 110 (e.g., when the edge switches A or B 104 receives the corresponding command frame and/or when the edge switches A or B 104 generates the mirror command frame).

The analytics and diagnostic node 110 receives the timestamps found within the mirror command frames to develop a variety of latency metrics for flow A 116. Based on the timestamps, the analytics and diagnostic node 110 is configured to determine the first response latency time, command completion latency time, and/or other latency between the initiator end node 102 and target end node 108. The term command completion latency time can be generally referred and interchanged with the term exchange completion time within this disclosure. In addition to the analytics and diagnostic node 110 obtaining the different latency metrics, the analytics and diagnostic node 110 also provides flow monitoring support that learns flow A 116 and monitors performance metrics associated with flow A 116, such as input-output operation per second (IOPS) statistics, data rates, and the number of bytes written and read. The analytics and diagnostic node 110 uses the latency metrics to monitor device metrics and oversubscription for flow A 116.

To monitor oversubscription, the analytic and the diagnostic node 110 combines the average data rate for flow A 116 with other average data rates for multiple flows to determine a cumulative data rate for flows that traverse a common network port and/or the link (e.g., link that connects initiator end node 102 to edge switch A 104) for one or more bucket time intervals (e.g., about 10 milliseconds (ms)) within an evaluation time period (e.g., about one second). The bucket time interval of about 10 ms and the evaluation time period of about one second are only examples, and other time intervals and periods can be used. The analytics and diagnostic node 110 checks if any of the bucket time intervals violate one or more oversubscription rules and flag violations of the oversubscription rules to indicate oversubscription. In one embodiment, the oversubscription rule determines whether the number of frames that arrive at initiator end node 102 and/or target node 108 for a plurality of flows is greater than or equal to a maximum number of frames corresponding to the port speed of a bucket time interval.

Figure 2:
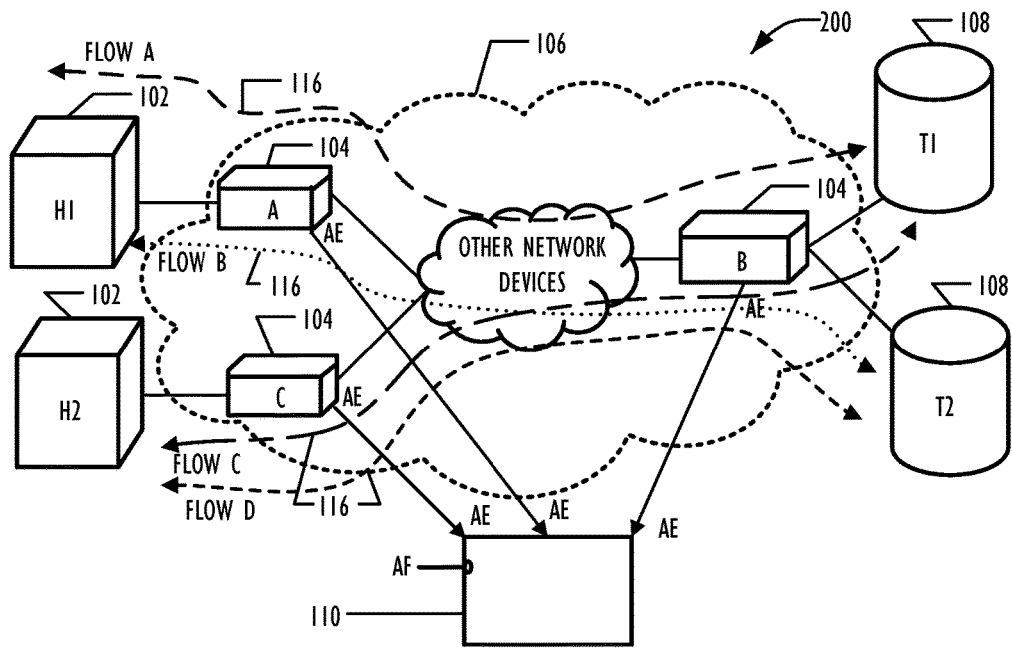
FIG. 2 is a schematic diagram of an embodiment of a fabric network that comprises a plurality of flows between a plurality of initiator end nodes and a plurality of target end nodes.

FIG. 2 is a schematic diagram of an embodiment of a fabric network 200 that comprises a plurality of flows 116 between a plurality of initiator end nodes 102 and a plurality of target end nodes 108. Each of the flows 116 represent a conversation between an initiator and target (IT) or an initiator, target, and LUN (ITL). Similar to FIG. 1, for each flow 116, the analytics and diagnostic node 110 monitors and receives mirror command frames from multiple edge switches 104. In FIG. 2, the analytics and diagnostic node 110 receives mirror command frames from edge switches A and B 104. The mirror command frames from edge switch A 104 are used to monitor and track the data throughput and frame timing for one or more flows (e.g., flows A and B 116) that traverse the link between the initiator end node 102 and edge switch A 104 (e.g., a fabric-node (F-N) port link). The mirror command frames from edge switch B 104 are used to monitor and track the data throughput and frame timing for one or more flows (e.g., flows A-D 116) that traverse the link between edge switch B 104 and the target end node 108. By tracking the mirror command frames, the analytics and diagnostic node 110 is capable of tracking network operations, such as SCSI operations, and derive a comprehensive set of network metrics that are maintained at a flow granularity level, which is also referred to in this disclosure as flow metrics. The types of flow metrics collected and maintained by the analytics and diagnostic node 110 will be discussed in FIG. 11. Other embodiments of fabric network 200 also have the analytics and diagnostic node 110 receive command frames from other network devices within fabric 106.

The analytics and diagnostic node 110 is also configured to automatically discover each of the flows 116 after activating the generation of mirror command frames on the monitored switch. For example, in an IT flow, the flow 116 is discovered and tracked using an IT metric entry when a command frame is sent between an initiator end node 102 and target end node 108. Alternatively, in an ITL flow, the flow 116 is discovered and tracked using an ITL metric entry when a read and/or write command is sent to a specific LUN located within the target end node 108. The analytics and diagnostic node 110 uses a system monitoring analytics flow between the AE port of the analytics diagnostic node and the AF port to learn and monitor the IT and ITL flows. Learning and managing flows are discussed in more detail in FIG. 4.

Figure 3:
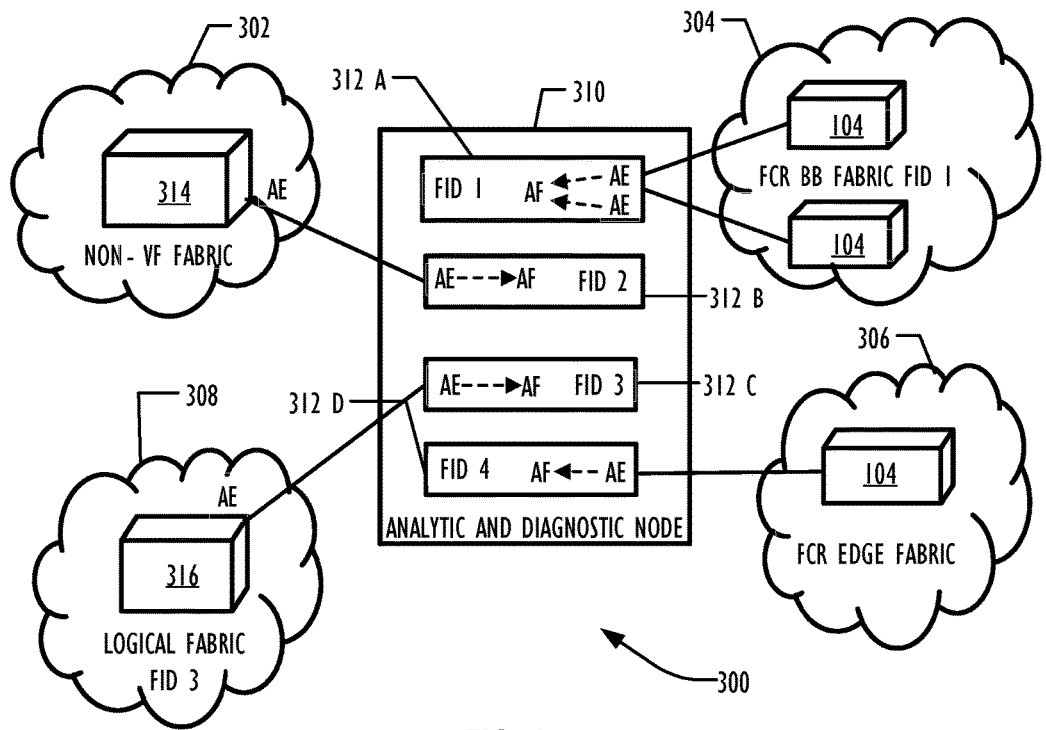
FIG. 3 is a schematic diagram of an embodiment of a multi-fabric network where embodiments of the present disclosure may operate herewith.

FIG. 3 is a schematic diagram of an embodiment of a multi-fabric network 300 where embodiments of the present disclosure may operate herewith. The analytics and diagnostic node 310 is substantially similar to the analytics and diagnostic node 110 as shown in FIG. 1 except that the analytics and diagnostic node 310 is configured to receive mirror command frames from a plurality of fabric networks 302, 304, 306, and 308. In FIG. 3, the analytics and diagnostic node 310 has been partitioned into virtual analytics platform instances 312 A-D that are designated to monitor oversubscription and measure latency for fabric networks 302, 304, 306, and 308. Specifically, virtual analytics platform instances 312 A connects to fabric network 304; virtual analytics platform instances 312 B monitors fabric network 302; virtual analytics platform instances 312 C monitors fabric network 308; and virtual analytics platform instances 312 D monitors fabric network 306.

FIG. 3 also illustrates that fabric networks 302, 304, 306, and 308 are different types of fabric networks and assigned different FIDs. In FIG. 3, fabric networks 304 and 306 are configured to provide FC routing services using a plurality of network devices, such as edge switches 104. Fabric network 304 is configured as a backbone fabric network and assigned FID 1 while fabric network 306 is configured as an edge fabric network and assigned FID 4. Fabric network 302 is a non-virtual fabric (VF) network that comprises a plurality of non-VF capable switches 314 (e.g., non-VF capable layer 2 switches) and assigned FID 2. Fabric network 308 is a VF network or logical network that comprises a plurality of logic switches 316 and assigned FID 3.

As shown in FIG. 3, each virtual analytics platform instance 312 A-D connects to a different fabric through separate AE Ports. Each monitored switch (e.g., edge switch 104, VF capable switch 314, logical switch 316) has an AE Port that is connected to the analytics and diagnostic node 310 through ASL connections. Multiple switches in a fabric can be monitored by the same virtual analytics platform instance 312 A-D. For multiple ASL connections from a single fabric, the monitored switch connects to the AE ports that reside on the same logical partition. In FIG. 3, edge switches 104 from fabric network 304 are connected to two different AE ports that correspond to virtual analytics platform instances 312 A. Additionally, mirrored traffic for a single fabric are all directed to the same AF Port residing on the corresponding virtual analytics platform instance 312 A-D. Mirror traffic from edge switches 104 located in fabric network 304 are directed to the same AF Port in virtual analytics platform instance 312 A.

In one embodiment, when a monitored switch is partitioned into separate instances and connected to separate virtual analytics platform instances 312 A-D, only one active system analytics mirror flow can be active at a time. For example, logical switch 316 in fabric 316 may be one of multiple instances for a monitored switch. Each of the other instances on the monitored switch can be connected to virtual analytics platform instances 312 A and B, respectively. Although each ASL link for each of the virtual instance is valid, only one system analytics mirror flow can be active. In other words, the monitored switch is configured to provide mirror command frames to one of the virtual analytics platform instances 312 A-C for a given time period even though the monitored switch is logically connected to three of the virtual analytics platform instances 312 A-C. Other aspects of monitoring multi-fabric network 300 include that since the virtual analytics platform instances 312 A-D are logical partitions, each partition can be connected to any fabric regardless of the FID.

In another embodiment, a monitored switch is configured to simultaneously handle multiple active system analytics mirror flows at a time when multiple partitions of the monitored switches are connected to one or more virtual analytics platform instances 312. Using FIG. 3 as an example, logical switch 316 in fabric 316 may be one of multiple instances for a monitored switch. In FIG. 3, the logical switch 316 is connected to virtual analytics platform instance 312C, while others instances on the monitored switch could be connected to virtual analytics platform instances 312 A and B. Each ASL link for each of the virtual instances on the monitored switch are not only valid, but can also simultaneously have an active system analytics mirror flow. In this instance, the monitored switch is configured to provide mirror command frames to more than one of the virtual analytics platform instances 312 A-C for a given time period.

Although FIGS. 1-3 illustrate specific fabric networks, the disclosure is not limited to that application and/or the specific embodiment illustrated in FIGS. 1-3. For instance, although embodiments of the present disclosure may generally be described in terms of FC fabrics and using FC terminology, the problems and techniques for oversubscription and obtaining latency metrics are not limited to FC fabrics and protocols, but may be implemented using similar techniques to those described above in Ethernet and other types of networks, including lossless networks using Institute of Electrical and Electronics Engineers (IEEE) Data Center Bridging. Additionally, although FIGS. 1-3 include a single analytic and diagnostic node 110 and 310, other network systems may include more than one analytic and diagnostic node that receives mirror command frames from one or more monitored switches. In particular, other network systems can be configured to have multiple analytic and diagnostic nodes monitor the same monitored switch to improve scaling capability. The use and discussion of FIGS. 1-3 is only an example to facilitate ease of description and explanation, and thus, detecting oversubscription and measuring latency may be used in a variety of different types of networks that implement different network protocols.

Figure 4:
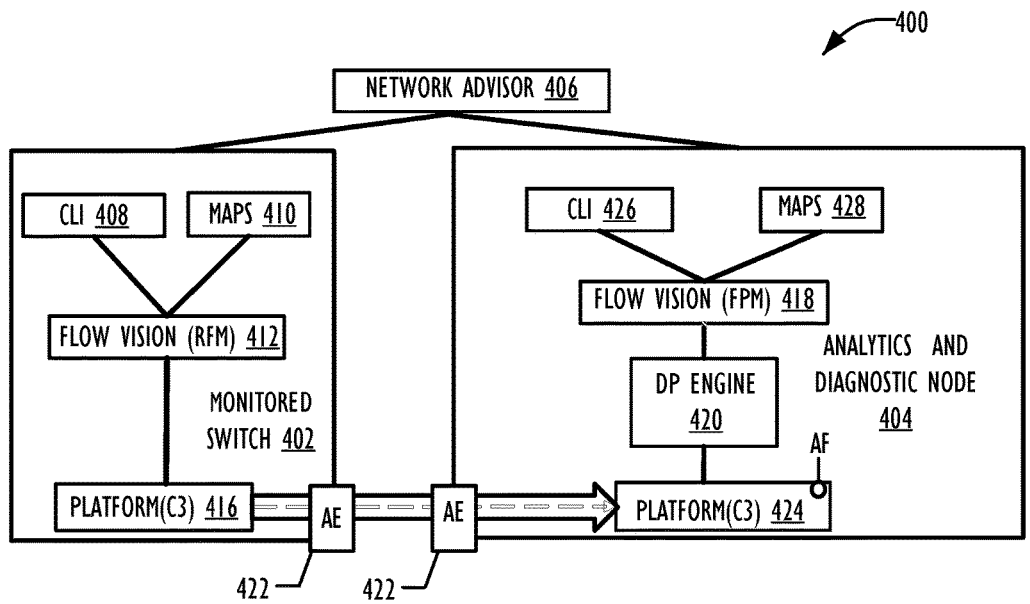
FIG. 4 is a schematic diagram of an embodiment of a network architecture that detects for oversubscription and measures a variety of latency metrics.

FIG. 4 is a schematic diagram of an embodiment of a network architecture 400 that monitors oversubscription and measures a variety of latency and performance metrics. In FIG. 4, the network architecture 400 comprises a network advisor 406 configured to manage and monitor the analytics and diagnostic node 404. In addition to managing and monitoring the analytics and diagnostic node 404, the network advisor 406 is configured to manage data, storage devices, and converged networks and deliver visibility and insight access to different networks, such as a SAN fabric. FIG. 4 also illustrates that the network architecture 400 comprises a monitored switch 402 that communicates with the analytics and diagnostic node 404 using AE ports 422.

The monitored switch 402 is configured to capture and copy command frames exchanged between network devices, such as an initiator end node and target end node. As shown in FIG. 4, the monitor switch comprises a command line interface (CLI) module 408, a monitoring and alerting policy suite (MAPS) module 410, a flow vision component 412, and a switch analytics platform 416. The CLI module 408 is configured as a user interface that receives commands from a network administrator. For example, the CLI module 408 is able to modify port definitions for a system analytics mirror flow between the monitored switch 402 and the analytics and diagnostic node 404. The switch analytics platform 416 comprises an analytics ports (e.g., a virtual tap (vTap) port) used to forward mirror commands to the AE port. The switch analytics platform 416 may also include a computing application and/or environment executed on hardware for managing mirror commands on the monitored switch 402. In preferred embodiments, the switch analytics platform 416 includes a switch application-specification integrated circuit (ASIC) that can perform hardware frame analysis and header building, with configuration handled by various software modules running on the control processor (not shown in FIG. 4) in the monitored switch 402.

The MAPS module 410 is configured to store and implement a rule and/or policy relating to the scalability of monitoring real-time data traffic with the analytics and diagnostic node 404. To support scalability monitoring, the MAPS module 410 monitors a variety of metrics at the monitored switch side of each ASL connection and compares the switch metrics to one or more thresholds to alert a network administrator of possible performance issues, such as oversubscription. Examples of monitored switch metrics include IOPS monitoring for mirrored traffic, latency monitoring for mirrored back-end port traffic, and fabric performance impact monitoring. For IOPS monitoring, the MAPS module 410 monitors the number of IOPS per ASIC in the mirrored traffic. In one embodiment, the MAPS module 410 monitors the mirrored IOPS at about one second intervals and triggers an alert when an I/O condition reaches a threshold limit of 250,000 IOPS. After triggering an alert, the MAPS module 410 redistributes the monitored switch's analytics ports across multiple ASICs, which in turn distributes the mirrored command frames from monitored flows across the ASICs. In regards to fabric performance impact monitoring, the MAPS module 410 monitors active AE Ports for latency issues using or more fabric performance rules, such as latency impact, frame drops due to congestion, and frame drops due to class 3 timeouts. The MAPS module 410 fences the affected AE port when the monitored switch 402 violates one or more thresholds associated with fabric performance. In preferred embodiments, the MAPS module 410 includes elements of the switch ASIC to do frame counting and software elements to program the counters and to read the counters and to perform data manipulation.

The flow vision component 412 is configured to capture and generate mirror command frames that are sent from the monitored switch 402 to the analytics and diagnostic node 404 through an AE Port-to-AE Port ASL link. After receiving a command frame originating from an end node at an analytics port, the flow vision component 412 creates a mirror command frame that copies the received command frame (e.g., the original frame header and payload). The mirror header comprises a timestamp that indicates when the analytics port receives the command frames and/or when the flow vision component 412 generates the mirror command frame. For example, the timestamp indicates when the monitored switch 402 receives a command frame, such as a SCSI command (e.g., SCSI read frame, SCSI write frame, first response frame, status frame indicating success or failure of a SCSI command, and abort sequence (ABTS) frame) at the analytics port and/or the generation time of the mirrored command frame at the monitored switch 402. In one embodiment, the flow vision component 412 generates the timestamp in the mirror command frame even though the network fabric, end nodes, and/or the analytics and diagnostic node 404 are not synchronized with each other. Additional headers may be appended for inter-fabric routing of the mirror command frame. Creating and transmitting the mirror frames to a remote diagnostic system, such as the analytics and diagnostic node 404, is described in more detail in U.S. Pat. No. 8,996,720.

In one embodiment, the flow vision component 412 generates and transmits mirror command frames to the analytics and diagnostic node 404 by performing remote flow mirroring. Remote flow mirroring is associated with a system analytics mirror flow that mirrors command frames from the monitored switch 402 to the analytics and diagnostic node 404 without disrupting traffic for a fabric. A network administrator using the CLI and/or network advisor activate the system analytics mirror flow to create and transmit mirror command frames. To activate a system analytics mirror flow, a network advisor first activates an ASL, then the system analytics mirror flow, configures the AF port on the analytics and diagnostic node 404, and imports the AF port configurations to the flow vision component 412. The system analytics mirror flow is configured to mirror the command frames received on all network ports that connect to end nodes (e.g., F ports) on monitored switch 402, on specified network ports that connect to end nodes on monitoring 402, and/or a group of network ports that connect to end nodes on edge switch 402. The group of network ports can be defined using logical groups, either static or dynamic membership, as defined in MAPS. In one embodiment, the flow vision component 412 has only one RFM flow active at a time on the monitored switch 402 regardless of the number of configured logical switch partitions. In other embodiments, the flow vision component 412 has more than one RFM flow active at a time. In preferred embodiments, the flow vision component 412 includes elements of the switch ASIC to perform command frame detection and mirroring and header building as instructed by software elements executing on the switch control processor (not shown in FIG. 4).

The analytics and diagnostic node 404 is configured to process mirror command frames transmitted from switch 402 and does not route normal data traffic, such as device-to-device traffic. In one embodiment, the analytics and diagnostic node 404 discards any received normal data traffic. The analytics and diagnostic node 404 monitors and collects network metrics based on the mirror command frames. Examples of network metrics include, but are not limited to, I/O latency measurements and network performance measurements. Table 1 provides an example of I/O latency measurements for a variety of I/O latency metrics collected by the analytics and diagnostic node 404. The number of pending I/Os describes the average number of outstanding I/Os present at the point of time a command frame is received by a target end node. Additionally, the I/O latency metrics may be grouped by I/O block sizes, for example, blocks sizes that are less than 8K, 8K to less than 64K, 64K to less than 512K, and 512K or greater.

TABLE 1

| | | Max | | | Average | | |
|---|---|---|---|---|---|---|---|
| IO Latency Metrics | IO Size | 10 sec | 5 min | All | 10 sec | 5 min | All |
| Read Completion | <8K<br>8K-<64K<br>64K-<512K<br>>=512K | | | | | | |

TABLE 1-continued

| | | Max | | | Average | | |
|---|---|---|---|---|---|---|---|
| IO Latency Metrics | IO Size | 10 sec | 5 min | All | 10 sec | 5 min | All |
| Read First Response | | | | | | | |
| Write Completion | | | | | | | |
| Write Xfer Ready | | | | | | | |
| Pending IOs | | | | | | | |
| Fabric Latency | All | | | | | | |
| Other command completion | All | | | | | | |

Table 2 provides an example of network performance metrics collected by the analytics and diagnostic node 404, which also includes the total number of IOPS and data transfer rates for the read and write data. As shown in Table 2, the analytics and diagnostic node 404 can determine the maximum and/or average values for the IOPS and data transfer rates.

TABLE 2

| | | Average | | | Total | | |
|---|---|---|---|---|---|---|---|
| Performance Metrics | IO Size | 10 sec | 5 min | All | 10 sec | 5 min | All |
| Read IOPS | <8K | | | | | | |
| | 8K-<64K | | | | | | |
| | 64K-<512K | | | | | | |
| | >=512K | | | | | | |
| Write IOPS | | | | | | | |
| Read Data Rate | | | | | | | |
| Write Data Rate | | | | | | | |

To obtain a variety of latency and performance metrics for monitoring oversubscription, the analytics and diagnostic node 404 comprises a CLI module 426, a MAPS module 428, a flow vision module 418, a data path engine 420, and an analytic and diagnostic platform 424. The analytic and diagnostic platform 424 may be a computing application and/or environment executed on hardware to host and operate the analytics and diagnostic node 404. The analytic and diagnostic platform 424 is configured to connect to any fabric network regardless of its assigned fabric identifier. As with the switch analytics platform 416, the analytics and diagnostic platform 424 preferably includes a switch ASIC to perform hardware frame analysis in conjunction with various software modules running on a control processor (not shown in FIG. 3) and forwards the mirror command frames to flow vision module 418 for header processing. Switch logic (e.g., an ASIC switch logic) in the analytic and diagnostic platform 424 does not cause fabric identifier conflicts and can comprise partitions that connect to one fabric at a time to avoid undesirable behavior. The analytic and diagnostic platform 424 is also configured to set at least some of the ports of the analytics and diagnostic node 404 as an AF port, which acts as the destination port for mirror command frames. After receiving the mirror command frames over ASLs for one or more system analytics mirror flows, the analytic and diagnostic platform 424 directs the mirror command frames to the AF port using a system monitoring analytics flow. The system monitoring analytics flow is a flow inside the analytic and diagnostic platform 424 between the associated AE port and AF port. In one embodiment, only one AF port is permitted per fabric and supported for instance of the analytic and diagnostic platform 424. The AF port cannot be configured to support other diagnostic functions, such as D_port functions and/or Spinfab.

The AE ports are configured as network ports that carry the mirror command traffic between the monitored switch 402 to the analytics and diagnostic node 404 via an ASL. The analytic and diagnostic platform 424 supports one or more AE ports connected to a monitored switch 402. In this embodiment, the ASLs are aggregated together, which is also be referred to as trunking, such that more than one AE port connects to the same monitored switch 402. Example embodiments of AE port speeds include, but are not limited to, about 8 Gbps and about 16 Gbps. The AE ports are also configured to support other diagnostic functions, such as D_port functions used to run link diagnostics and isolate link failures. For example, the AE ports are able to support a variety of D_port modes, such as static mode, dynamic mode, and/or on-demand mode.

The data path engine 420 is configured to perform I/O and flow learning. Each I/O operation in a flow conversation is tracked to derive a comprehensive set of network metrics (e.g., metrics shown in Tables 1 and 2). The data path engine 420 automatically discovers each of the flows and I/Os associated with the flows. In particular, the data path engine is configured to discover an IT flow through a command frame sent between an initiator end node and target end node. Additionally, the data path engine discovers an ITL flow through read and/or write commands to a specific LUN located within a target end node.

In one embodiment, the data path engine 420 is also configured to manage the flows, such as freeing flows that have been inactive for a set period of time and/or performing a flow reset. The data path engine 420 releases a flow after a set period of inactive duration and/or if the allocated flow resources are relatively low. By releasing aging flows, the data path engine 420 enables new flows to be discovered and learned. After releasing a flow, network metrics and/or statistics associated with the aged out flow are cleared within the data path engine 420, while the network advisor 406 maintains the history information. The data engine 420 also implements a flow reset that deletes some or all of the flow resources, clears some or all of the different flows (e.g., IT/ITL flows) and associated flow metrics and statistics. After performing a flow reset, the data path engine 420 initiates and perform a re-learning of the flows. In preferred embodiments, the data path engine 420 includes portions of the switch ASIC to detect frames in flows, with software modules executing on the control processor controlling the hardware portions and determining particular flows being monitored in the hardware and the software.

The flow vision module 418 implements flow performance monitoring that collects and maintains network metrics at a flow granularity level and exports collected network statistics to the CLI module 426, MAPS module 428, and/or the network advisor 406. Examples of the flow metrics the flow vision module 418 collects and maintains are shown in Tables 1-3. Flow metrics, such latency metrics are discussed in more detail in FIG. 11. The flow vision module 418 monitors flow performance by monitoring traffic using the learned flows provided by the data path engine 420. To collect network metrics, the flow vision module 418 monitors the frame count and data statistics associated with command frames, such as read and write SCSI instructions, for each of the flows. Afterwards, the flow vision module 418 exports the network metrics to MAPS module 428 to provide threshold-based monitoring and alerting based on the network metrics for each of flows. In the preferred embodiments, the flow vision module 418 includes portions of the switch ASIC to do a portion of the operations, such as counting frames on flows, and software modules executing on the control processor and on a compute engine to configure the hardware portions, to analyze received mirror command frames and to develop the various metrics and other values discussed herein.

In one embodiment, the flow vision module 418 is configured to measure latency metrics for a variety of commands, such as read command latency and write command latency, for a flow. For read command latency, the flow vision module 418 measures two types of read command latency, which are first response read latency and read command completion latency. The first response read latency represents the time taken between a read command and the first read data frame, while the read command completion latency is the time taken between the read command being issued by the initiator end point and the status frame being issued by a target end node. For write command latency, the flow vision module 418 also measures two types of write command latency, which are the first response write latency and the write command completion latency. The first response write latency represents the time taken between the write command the first transfer ready issued by the target end node, and the write command completion latency is the time taken between the write command being issued by the initiated end node and the status frame sent by the target end nodes. The read and write command completion latencies are generally referred to as the command completion time within this disclosure, and the first response read and write latencies may be generally referred to as the first response latency time within this disclosure. The read command latency and write command latency will be discussed in more detail in FIGS. 9 and 10.

To determine the average data rate for a flow, the flow vision module 418 determines the time difference between the exchange completion latency and the first response latency. The time period between the exchange completion latency and the first response latency refers to the total time used to transmit N data frames. The total number of bits transmitted are determined by summing up the bit lengths for the N data frames. The number of bits for the N data frames can be determined by reading counters in the switch ASIC or by determining the total number of bytes to be transferred as indicated in the read or write command. For example, if each of the data frames comprise M number of bits, then the total number bits transmitted during the time period would be N*M bits. The flow vision module 418 determines the average data rate, which can be expressed in bits per second, by dividing the total number of bits transmitted (e.g., N*M) by the time period.

After obtaining the average data rates for all of the flows for a given network port and/or link, the flow vision module 418 calculates the cumulative data rates for a plurality of bucket intervals within an evaluation time period (e.g., about 1 second). A cumulative data rate represents the sum of the average data rates for all of the flows at specific bucket intervals, such as about 10 ms intervals. Determining cumulative data rates is discussed in more detail in FIGS. 12 and 13. The flow vision module 418 forwards the cumulative data rates to the MAPS module 428 to compare the cumulative data rate for all of the flows traversing a given network port and/or link with a threshold value. If for any of the bucket intervals the cumulative data rate exceeds the threshold value, such as a line rate of the link, the MAPS module 428 raises a flag indicating oversubscription.

Figure 5:
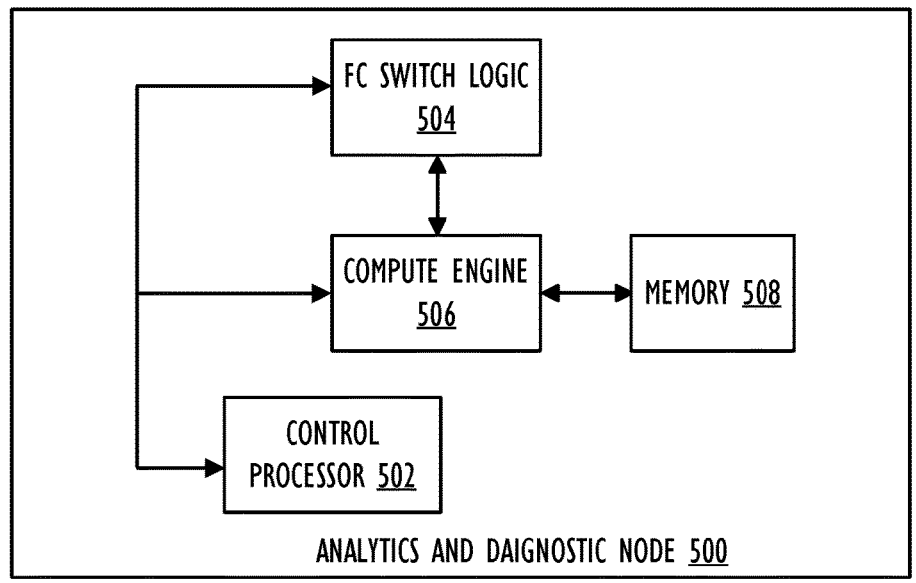
FIG. 5 is a schematic diagram of an embodiment of an analytics and diagnostic node configured to detect oversubscription and measure latency.

FIG. 5 is a schematic diagram of an embodiment of an analytics and diagnostic node 500 configured to detect oversubscription and measure latency. The analytics and diagnostic node 500 performs substantially the same functions as the analytics and diagnostic node 404 described in FIG. 4. FIG. 5 illustrates that the analytics and diagnostic node 500 comprises a control processor 502, a FC switch logic 504, a compute engine 506, and memory 508, which are used to perform operations regarding the MAPS 428, flow vision module 418, data patent engine 420 and analytic and diagnostic platform 424. The FC switch logic 504 is coupled to a plurality of media interfaces and/or network ports, which are not shown in FIG. 5. The network ports are configured as AE ports that are used to receive the command frames and/or as an AF port.

The FC switch logic 504 may be implemented using one or more ASICs and/or other special purpose built silicon or custom integrated circuit designs used to discover and maintain flows and perform other data plane operations. Generally, the control processor 502 configures the FC switch logic 504 to perform a variety of data plane operations, such as counting frames, queuing data frames, and routing data frames. The control processor 502 also configures the FC switch logic 504 to perform functions implemented by the analytic and diagnostic platform 424 and/or data path engine 420 as described in FIG. 4. The FC switch logic 504 forwards the information within the data frame (e.g., the timestamp and the FC frame header and FCP command) and flow discovery information to the compute engine 506. Based on the information received from the FC switch logic 504, the compute engine 506, which is also configured by the control processor 502, performs functions implemented by the flow vision module 418 and MAPS 428 as described in FIG. 4, such as parsing frame headers (e.g., mirror headers) and extracting header information, such as timestamp information. In preferred embodiments, to perform functions implemented by the flow vision module 418, the compute engine 506 includes portions of the switch ASIC to do a portion of the operations, such as counting frames on flows, and software modules executing on the control processor and on the compute engine to configure the hardware portions, to analyze received mirror command frames and to develop the various metrics and other values discussed herein. Additionally, to perform functions implemented by MAPs 428 the compute engine 506 includes elements of the switch ASIC to do frame counting and software elements to program the counters and to read the counters and to perform data manipulation.

The control processor 502 communicates and provide instructions to other components within the analytics and diagnostic node 500. In one embodiment, the control processor 502 may comprise one or more multi-core processors and/or memory media (e.g., cache memory) that function as buffers and/or storage for data. Additionally, control processor 502 could be part of one or more other processing components, such as ASICs, field-programmable gate arrays (FPGAs), and/or digital signal processors (DSPs). Although FIG. 5 illustrates that control processor 502 is a single processor, control processor 502 is not so limited and instead may represent a plurality of processors.

Memory 508 is a non-transitory medium configured to store various types of data. For example, memory 508 includes one or more memory mediums, such as secondary storage (e.g., flash memory), read-only memory (ROM), and/or random-access memory (RAM). The secondary storage are configured for non-volatile storage of data. In certain instances, the secondary storage is used to store overflow data if the allocated RAM is not large enough to hold all working data. The secondary storage also is used to store programs that are loaded into the RAM when such programs are selected for execution. The ROM is used to store instructions and perhaps data that are read during program execution. The ROM is typically a non-volatile memory device that has a small memory capacity relative to the larger memory capacity of the secondary storage. The RAM is used to store volatile data and instructions and typically is referred to as the working memory. In one more embodiments, memory 508 includes the software modules to configure the hardware portions of the analytics and diagnostic node 500 and that the control processor 502 and compute engine 506 may execute.

Figure 6:
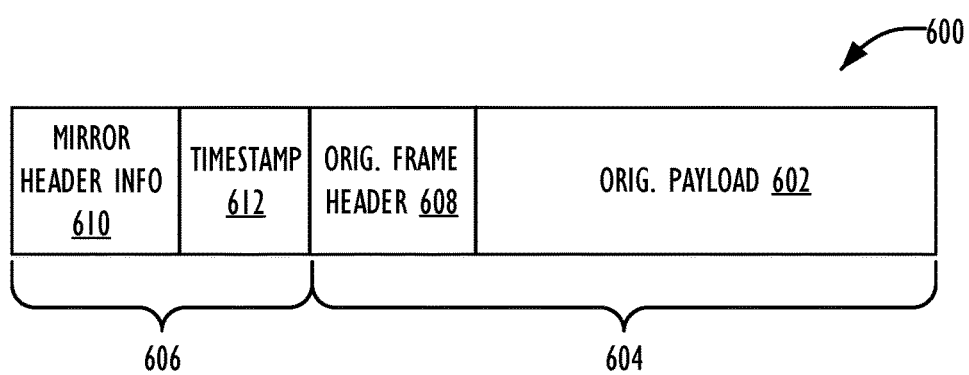
FIG. 6 is a schematic diagram of an embodiment of a mirror command frame sent to an analytic and diagnostic node.

FIG. 6 is a schematic of a preferred embodiment of a mirror command frame 600 sent to an analytic and diagnostic node. In FIG. 6, the mirror command frame 600 comprises the original command frame 604 and mirror header 606. The original command frame 604 comprises the original frame header 608 and original payload 602. The mirror header 606 comprises a timestamp element 612 that provides the time information regarding receiving and/or transmitting times related to a command frame. The mirror header 606 also comprise other mirror header information 610, such as the destination address of the analytic and diagnostic node's AE port. As shown in FIG. 6, the timestamp element 612 is placed toward the end of the mirror header 606, located between the original frame header 608 and the other mirror header information 610. Other embodiments of the mirror command frame may place the timestamp element 612 between other mirror header information 610. More detail regarding other mirror header information 610 is described in U.S. Pat. No. 8,996,720.

Figure 7:
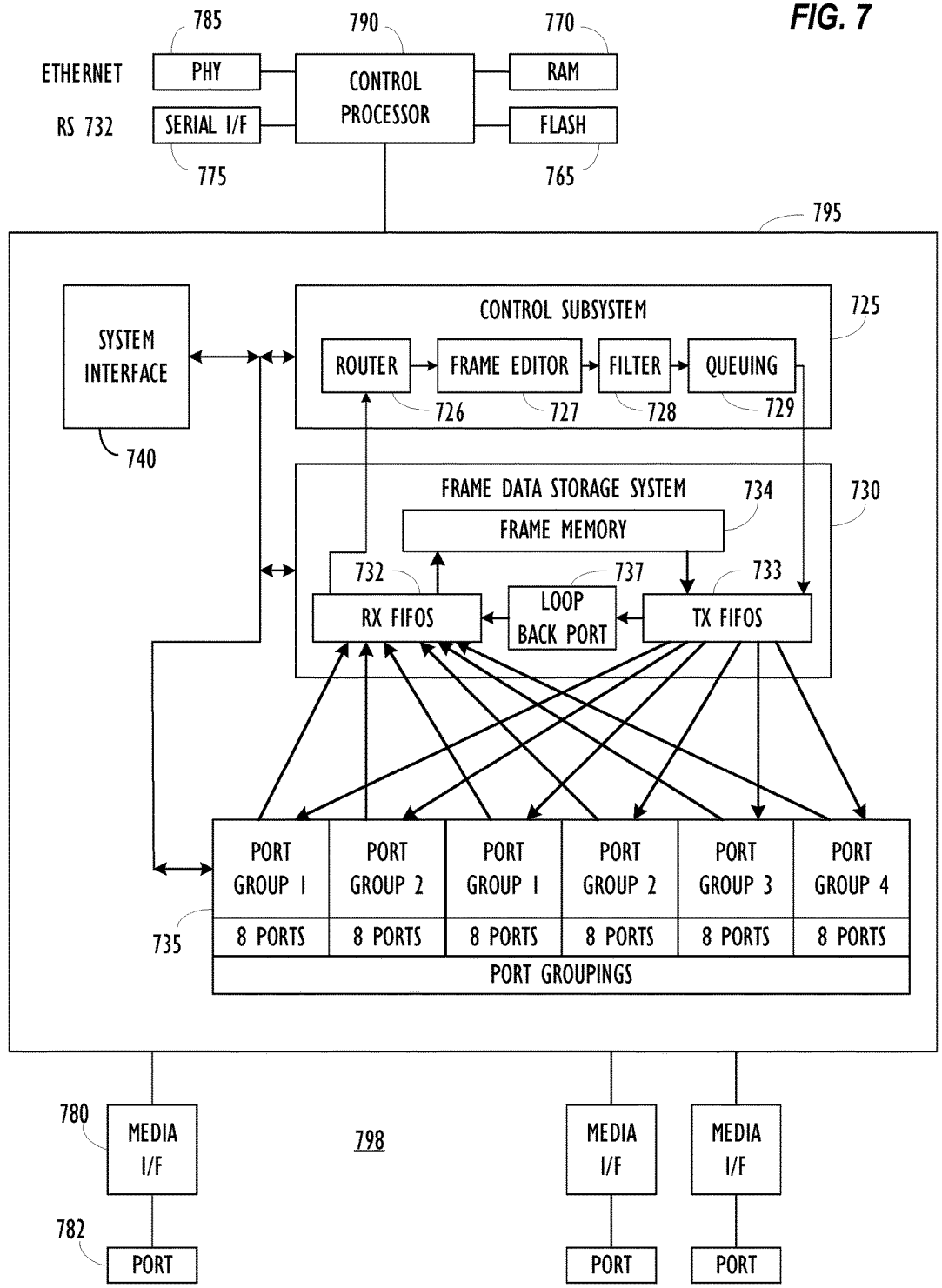
FIG. 7 is a schematic diagram of an embodiment of a monitored switch.

FIG. 7 is a schematic diagram of an embodiment of a monitored switch 798. As shown in FIG. 7, the control processor 790 is connected to a switch ASIC 795. The switch ASIC 795 is connected to media interfaces 780 which are connected to ports 782. Generally the control processor 790 configures the switch ASIC 795 and handles higher level switch operations, such as the name server, the mirror requests, and the like. The switch ASIC 795 handles the general high speed inline or in-band operations, such as switching, routing and frame translation. The control processor 790 is connected to flash memory 765 to hold the software, to RAM 770 for working memory and to an Ethernet PHY 785 and serial interface 775 for out-of-band management.

The switch ASIC 795 has four basic modules, port groups 735, a frame data storage system 730, a control subsystem 725 and a system interface 740. The port groups 735 perform the lowest level of frame transmission and reception. Generally, frames are received from a media interface 780 and provided to the frame data storage system 730 by the port groups 735. Further, frames are received from the frame data storage system 730 and provided to the media interface 780 for transmission out a port 782 by the port groups 735. The frame data storage system 730 includes a set of receive FIFOs 732 and a set of transmit FIFOs 733, which interface with the port groups 735, and a frame memory 734, which stores the received frames and frames to be transmitted. A loop back port 737 is connected to the transmit FIFOs 733 and receive FIFOs 732 to allow frames to be processed in multiple passes. The frame data storage system 730 provides initial portions of each frame, typically the frame header and a payload header for FCP frames, to the control subsystem 725. The control subsystem 725 has router block 726, frame editor block 727, filter block 728 and queuing block 729. The frame editor block 727 examines the frame header and performs any necessary header changes, such as those which will happen when a frame is mirrored as described herein. There can be various embodiments of the frame editor block 727, with examples provided in U.S. patent application Ser. No. 10/695,408 and U.S. Pat. No. 7,120,728, both of which are incorporated by reference in their entirety. Those examples also provide examples of the control/data path splitting of operations. The router block 726 examines the frame header and selects the desired output port for the frame. The filter block 728 examines the frame header, and the payload header in some cases, to determine if the frame should be transmitted. The queuing block 729 schedules the frames for transmission based on various factors including quality of service, priority and the like.

In preferred embodiments, timestamps are appended to received frames by a port group 735. This timestamp is captured and subsequently placed in the mirror command frame when the mirror command frame is built as described in U.S. Pat. No. 8,996,720, which is incorporated by referenced above. In certain embodiment, it may be desirable to develop a timestamp when a frame is being transmitted, such as the read or write command frame. In those embodiments, the timestamp can be obtained when the header is being developed for the mirror command frame. However, in most cases, timestamps developed at receipt are sufficient as delays through the switch may be minimal compared to the overall time being measured. For purpose of this description, the term receipt or receive shall be used for both cases for simplicity.

This is one embodiment for performing the required frame duplication and routing to accomplish mirroring as described herein. Other embodiments and different architectures can be used.

Figure 8:
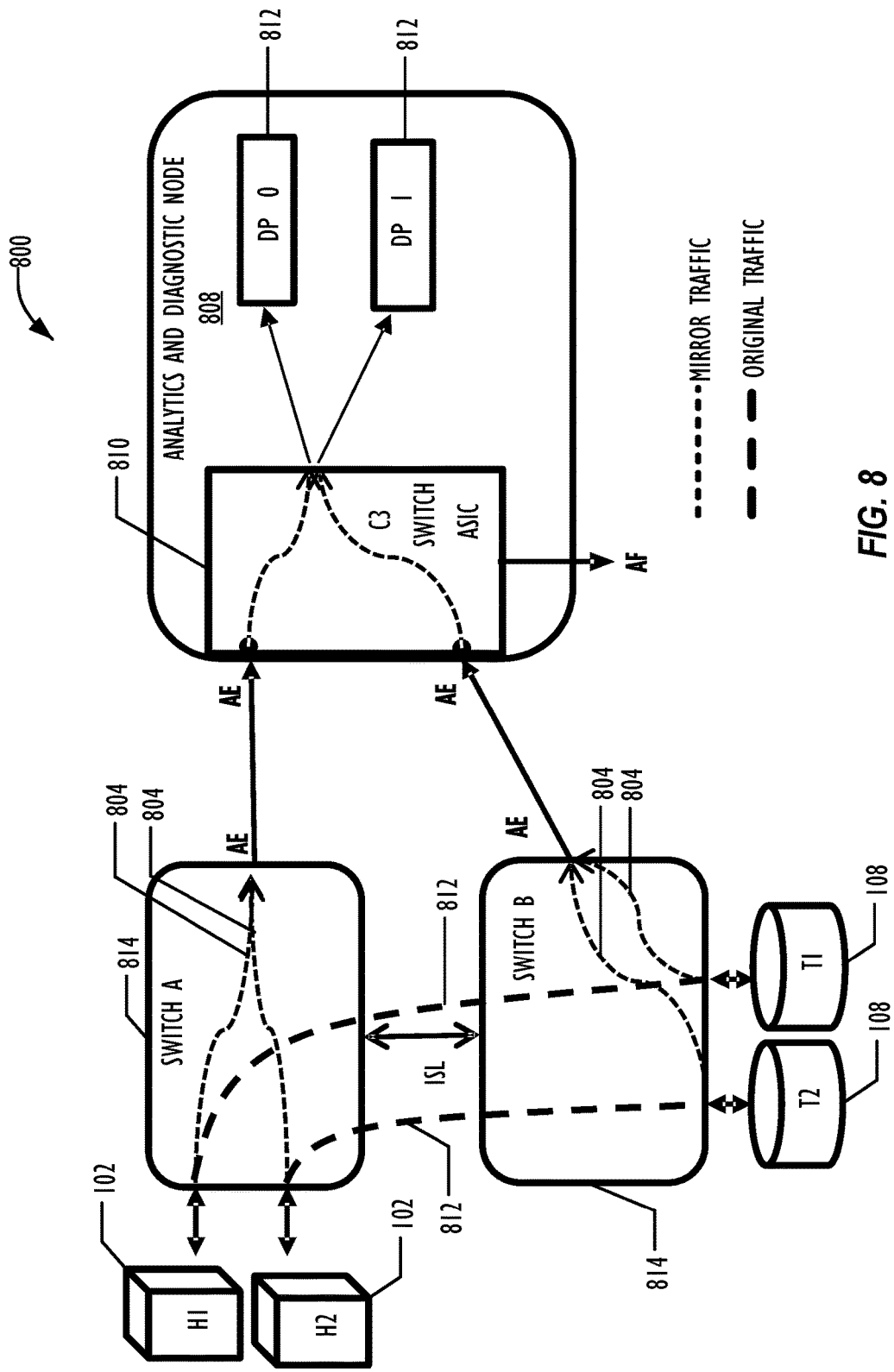
FIG. 8 is a schematic diagram of an embodiment of implementing double mirroring for multiple flows within a fabric network.

FIG. 8 is a schematic diagram of an embodiment of implementing double mirroring for multiple flows within a fabric network 800. Double mirroring refers to when a flow produces mirror command frames from both the initiator end node 102 and target end node 108 for the analytics and diagnostic node 808. As shown in FIG. 8, the analytics and diagnostic node 808 includes data processors 812 and switch ASIC 810. The switch ASIC 810 corresponds to the FC Switch Logic 504 in FIG. 5 and the analytic and diagnostic platform 424 in FIG. 4 that receive mirror command frames via an AE port and forward the received mirror command frames (e.g., includes mirror header, timestamp, original header, and original payload) for processing. FIG. 8 illustrates that mirror command frames may be forwarded to data processors 812, which corresponds to the control processor 502 and compute engine 506 shown in FIG. 5 and the flow vision module 418 and MAPS 428 in FIG. 4. The switch ASIC 810 forwards the mirror command frames to the data processors 812 based on which flow the mirror command frames are associated with.

In FIG. 8, original command frames 802 are communicated between the initiator end nodes H1 and H2 102 and the target end nodes T1 and T2 108, respectively. For example, in one flow, initiator end node H1 102 transmits a read command frame to target end node T1 108, and subsequently target end node T1 108 transmits a status command frame to initiator end node H1 102. When the original command frames 802 arrive at monitored switch A 814, monitored switch A 814 creates mirror command frames 804 and forwards the mirror command frames 804 to the analytics and diagnostic node 808 via an ASL between the two AE ports. When monitored switch B 814 receives the original command frames 802, monitored switch B 814 creates another set of mirror command frames 804 and forwards the set to the analytics and diagnostic node 808.

Once the analytics and diagnostic node 808 receives the mirror command frames 804, the switch ASIC logic 810 forwards the mirror command frames 804 to the appropriate data processors 812. Data processor A 812 is used to monitor the flow between the initiator end node H1 102 and target end node T2 108, and data processor B 812 is used to monitor the flow between the initiator end node H2 102 and target end node T1 108 in one embodiment, though the data processors 812 cooperate in processing tasks in general.

Figure 9:
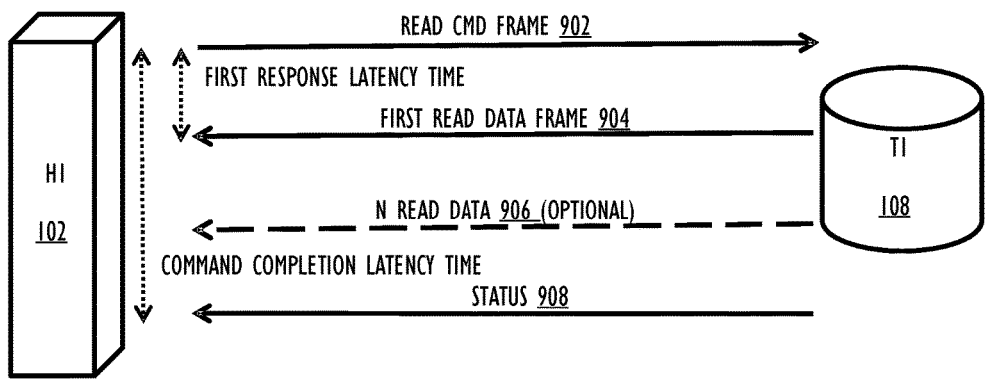
FIG. 9 is a protocol diagram for an embodiment of a read command operation between an initiator end node and a target end node.

FIG. 9 is a protocol diagram for an embodiment of a read command operation 900 between an initiator end node 102 and a target end node 108. To start the read command operation 900 for a given flow, the initiator end node 102 transmits a read command frame 902 to the target end node 108. Once the target end node 108 receives the read command frame 902, the target end node 108 transmits the first read data frame 904 back to the initiator end node 102. As shown in FIG. 9, the first response latency time refers to the time period between the issuance of the read command frame 902 and the first read data frame 904 reaches the initiator end node 102. After sending the first read data frame 904 the target end node 108 continues to transmit additional read data frames 906 to the initiator end node 102 to satisfy the read command. As soon as the target end node 108 forwards all of the read data frames 906 to the initiator end node 102, the target end node 108 transmits a status command frame 908 to the initiator end node 102. FIG. 9 illustrates that the command completion latency time, which can also be referred to within this disclosure as exchange completion time, is the time period between the issuance of the read command frame 902 at the initiator end node 102 and the status command frame 908 being received by the initiator end node 102.

To determine the first response latency time, the analytics and diagnostic node uses timestamps from mirror command frames received from a single monitored switch, such as an edge switch adjacent to the initiator end node. When a monitored switch receives each of the read command frame 902 and the first read data frame 904, the monitored switch creates mirror command frames that include timestamps that indicate the time the monitored switch receives the command frame. Using FIG. 8 as an example, monitored switch A 814 receives a read command frame 902 from initiator end node H1 102. Once the monitored switch A 814 receives the read command frame 902, the monitored switch A 814 creates the mirror read command frame and transmits the mirror read command frame to the analytics and diagnostic node 808. The read command frame 902 continues to monitored switch B 814 and subsequently reaches target end node T1 108. When receiving the read command frame 902, the target end node T1 108 responds with a first read data frame 904. After the monitored switch A 814 receives a first read data frame 904, the monitored switch A 814 creates a mirror first read data command frame and transmits the mirror first read data command frame to the analytics and diagnostic node 808. The mirror first read data command frame includes a timestamp that indicates when the monitored switch A 814 receives the first read data frame. The analytics and diagnostic node uses the time difference between the mirror read command frame and the mirror first read data command frame to determine the first response latency time. Because the timestamps are generated at the same monitored switch (e.g., monitored switch A 814), the monitored switch does not need to by synchronized with other monitored switches and/or network devices for the purposes of determining first response latency time.

To determine the command completion latency time, the analytics and diagnostic node determines the time difference between the mirror read command frame and the mirror status command frame using a single monitored switch. In one embodiment, the monitored switch is an edge switch node adjacent to the initiator end node that generates the mirror command frames. Using FIG. 8 as an example, a monitored switch A 814 constructs a mirror read command frame after receiving the read command frame 902 from the initiator end node H1 102. The monitored switch B 814 receives the read command frame 902 and forwards the read command frame 902 to the target end node T1 108. After transmitting the read data frames 906, the target end node T1 108 transmits a status command frame 908, where the monitored switch A 814 receives the status command frame 908. The monitored switch A 814 then constructs a mirror status command frame and transmits the mirror status command frame to the analytics and diagnostic node. The mirror status command frame includes a timestamp that indicates the receive time of the status command frame 908. The analytics and diagnostic node uses the timestamps in the mirror read command frame and the status read command frame to calculate the command completion latency time. Similar to determining the first response latency time, the monitored switch does not need to be synchronized with other monitored switches and/or network devices for the purposes of determining command completion latency time.

To determine the average data rate for the read data frames, the analytics and diagnostic node determines the time difference between the command completion latency time and the first response latency time. The time period between the command completion latency time and the first response latency time refers to the total time used to transmit N read data frames 906. The total number of bits transmitted is determined by summing up the bit lengths for the N read data frames. For example, if each of the read data frames 906 comprise M number of bits, then the total number bits transmitted during the time period would be N*M bits. The analytics and diagnostic node determines the average data rate, which can be expressed in bits per second, by dividing the total number of bits transmitted (e.g., N*M) by the time period.

Figure 10:
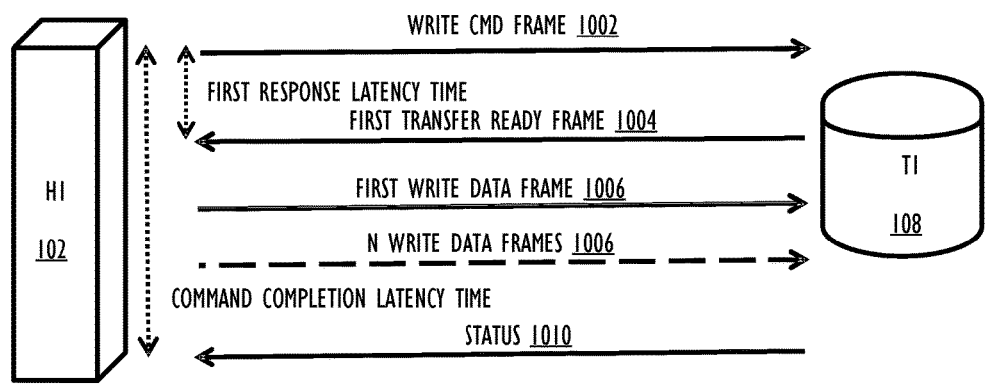
FIG. 10 is a protocol diagram for an embodiment of a write command operation between an initiator end node and a target end node.

FIG. 10 is a protocol diagram for an embodiment of a write command operation 1000 between an initiator end node 102 and a target end node 108. To start the write command operation 1000 for a given flow, the initiator end node 102 transmits a write command frame 1002 to the target end node 108. Once the target end node 1012 receives the write command frame 1002, the target end node 108 transmits a first transfer ready frame 1004 back to the initiator end node 102. The analytics and diagnostic node determines a first response latency time based on the amount of time taken between the issuance of the write command 1002 and the first transfer ready frame 1004 to reach the initiator end node 102. Afterwards, the initiator end node 102 transmits the write data frames 1006 to the target end node 108. Once the initiator end node 102 forwards all of the write data frames 1006 to the initiator end node 102, the target end node 108 transmits a status command frame 1010 back to the initiator end node 102. FIG. 10 illustrates that the command completion latency time refers to the amount of time taken between the issuance of the write command 1002 and the status command 1010 reaching the initiator end node 102.

To determine the first response latency time, the analytics and diagnostic node uses timestamps from mirror command frames received from a single monitored switch, such as an edge switch adjacent to the initiator end node. When a monitored switch receives a write command frame 1002 and the first transfer ready frame 1004, the monitored switch creates mirror command frame that include timestamps that indicate the time the monitored switch receives the command frame. Using FIG. 8 as an example, monitored switch A 814 receives a write command frame 1002 from initiator end node H1 102, creates the mirror write command frame and transmits the mirror write command frame to the analytics and diagnostic node 808. The write command frame 1002 continues to monitored switch B 814 and subsequently reaches target end node T1 108. When receiving the write command frame 1002, the target end node T1 108 responds with a first transfer ready frame 1004. After the monitored switch A 814 receives a first transfer ready frame 1004, the monitored switch A 814 creates and transfers the mirror first transfer ready frame to the analytics and diagnostic node 808. The mirror first transfer ready frame includes a timestamp that indicates when the monitored switch A 814 receives the first transfer ready frame. The analytics and diagnostic node uses the time difference between the mirror write command frame and the mirror first transfer ready frame to determine the first response latency time.

To determine the command completion latency time, the analytics and diagnostic node determines the time difference between the mirror write command frame and a mirror status command frame using a single monitored switch. In one embodiment, the monitored switch is an edge switch node adjacent to the initiator end node that generates the mirror command frames. Using FIG. 8 as an example, a monitored switch A 814 constructs a mirror write command frame after receiving the write command frame 1002 from the initiator end node H1 102 and transfers the mirror write command frame to the analytics and diagnostic node 808. The monitored switch B 814 receives and forwards the write command frame 1002 to the target end node T1 108. After receiving the write data frames 1006, the target end node T1 108 transmits a status command frame 1010, where the monitored switch A 814 receives the status command frame 1010. The monitored switch A 814 then constructs a mirror status command frame and transmits the mirror status command frame to the analytics and diagnostic node. The mirror status command frame includes a timestamp that indicates the receive time of the status command frame 1010. The analytics and diagnostic node uses the timestamps in the mirror write command frame and the mirror status command frame to calculate the command completion latency time.

Figure 11:
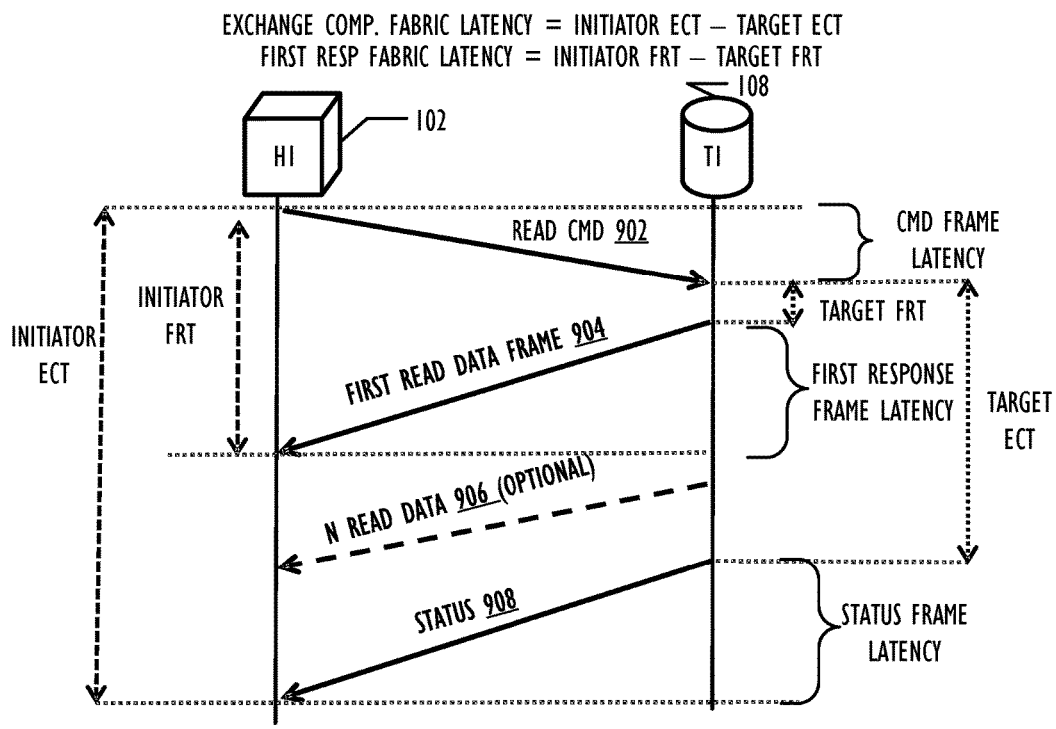
FIG. 11 is a protocol diagram for an embodiment of a read command operation used to determine latency for a given flow.

The analytics and diagnostic node analyzes fabric performance by correlating and comparing values at both the initiator and the target ports to drive one or more latency metrics between the target end node and initiator end node. FIG. 11 is a protocol diagram for an embodiment of a read command operation 1100 that includes a plurality of latency metrics for a given flow. Generally, the read command operation 1100 is substantially similar to the read command operation 900, where the initiator target end node 102 issues a read command frame 902; a first read data frame 904 is sent from the target end node 108 to the initiator end node 904; additional read data frames 906 are sent to the initiator end node 904; and a status command 908 is sent from the target end node 108 to the initiator end node 102. Using FIG. 8 as an example, by receiving mirror command frames from a first monitored switch 814 located next to the initiator end node 102 (e.g., monitored switch A 814) and a second monitored switch (e.g., monitored switch A 814) located next to the target end node 108, an analytics and diagnostic node is able to determine fabric latency metrics that include command frame latency, first response frame latency, status frame latency, and/or an exchange completion time and first response latency time at both the initiator and the target end nodes. Although FIG. 11 illustrates that these fabric latency metrics at both the initiator and the target correspond to a read command operation 1100, the fabric latency metrics illustrated in FIG. 11 may also be concern other commands, such as the write command operation shown in FIG. 10.

The analytics and diagnostic node determines an exchange completion fabric latency by determining the difference between the initiator exchange completion time and the target exchange completion time. Using FIG. 8 as an example, the initiator exchange completion time for the flow between the initiator end node H1 102 and target end node T1 108 is determined by comparing the timestamps for the mirror read command and the mirror status command received from monitored switch A 814. Specifically, the analytics and diagnostic node determines the initiator exchange completion time by determining the difference between the timestamp corresponding to the read command 902 and the timestamp corresponding to the status command 908 received by monitored switch A 814. The target exchange completion time is obtained by determining the difference between the timestamp corresponding to the read command and the timestamp corresponding to the status command received by monitored switch B 814. The target exchange completion time is then subtracted from the initiator completion time to provide the exchange completion fabric latency value.

The analytics and diagnostic node determines the first response fabric latency by computing the difference between the initiator first response latency time and the target first response latency time. Using FIG. 8 as an example, the initiator first response latency time is determined by comparing the timestamps of mirror command frames received from monitored switch A 814 that correspond to the read command frame 902 and the first read data frame 904. The target first response latency time is obtained by determining the difference between the timestamps of mirror command frames corresponding to the read command 902 and the timestamp corresponding first read data frame 904 received by monitored switch B 814. In determining both the first response fabric latency and the exchange completion fabric latency, the monitored switches (e.g., monitored switches A and B 814) do not need to be time synchronized.

Other fabric latency metrics an analytics and diagnostic node is able to ascertain include the command frame latency, first response frame latency, and the status frame latency. The command frame latency represents the time period when a command frame (e.g., read command frame 902 or write command frame) is sent from an initiator end node and when the frame is received by the target end node. The first response frame latency represents time period between when a target end node returns a first response frame (e.g., first read data frame 904) and when the initiator end node receives the first response frame. The status frame latency represents the time period between the target end node issues a status frame and when the status frame is received at the initiator end node. Using FIG. 8 as an example, monitored switch A 814 creates and transmits mirror command frames that include timestamps corresponding to the initiator end node H1 102 and monitored switch B 814 creates and transmits mirror command frames that include timestamps corresponding to the target end node T1 108. For instance, to determine command frame latency, the analytics and diagnostic node uses the timestamp from the mirror read command frame sent from monitored switch A 814 and a timestamp from the mirror read command frame sent from the monitored switch B 814. To determine the command frame latency, first response frame latency, and the status frame latency, the monitored switches need to be time synchronized.

Based on the different latency metrics, the analytics and diagnostic node isolates and identifies performance issues within the fabric and/or at the different end nodes. Table 3 provides a summary of the possible issues the analytics and diagnostic node can determine based on the calculated latency metrics shown in FIG. 11. The values in Table 3 are calculated based on when the monitored frame enters and exits the fabric. For example, in Table 3, after determining the latency metrics shown in FIG. 11, the analytics and diagnostic node determines that the initiator exchange completion time and the exchange completion fabric latency both have relatively high time period and the target exchange completion time has a relatively normal time period (i.e., row 3 of Table 1). In one embodiment, to determine whether a latency metric has a relatively high value, the analytics and diagnostic node compares the measure time periods and/or latency values to one or more threshold values. A threshold value represents a maximum time or latency value for a corresponding metric. The threshold values may be predefined by a network administrator and/or automatically generated from one or more network parameters. Based on these latency metrics, the analytics and diagnostic node then determines the occurrence of oversubscription and that the fabric may have a flow being affected by a slow drain device and/or other some other fabric issue. In another example, if the analytics and diagnostic node determines that the initiator exchange completion time, the target exchange completion time, and the exchange completion fabric latency all have relatively high time periods, the analytics and diagnostic node determines that the port for the target end node has a Fibre Channel Slow Drain Device.

TABLE 3

|  | Initiator Value | Target Value | Fabric Value | Explanation |
|---|---|---|---|---|
| Exchange completion time (ECT) or First response time (FRT) | High | High | High | Target port has a Fibre Channel (FC) Slow Drain Device (SDD). |
| ECT/FRT | High | High | Normal | Target port has a SCSI SDD. |
| ECT/FRT | High | Normal | High | Fabric has a flow being affected by a SDD. Oversubscription. Another fabric impact issue. |
| CMD frame latency delay | — | — | High | Target port has a SDD. Target port has a flow being affected by a SDD. Another fabric impact issue. |
| Status/First Response frame latency delay | — | — | High | Server has a SDD. Server has a flow being affected by a SDD. Another fabric impact issue. |
| ECT/FRT/delay | Normal | Normal | Normal |  |

Figure 12:
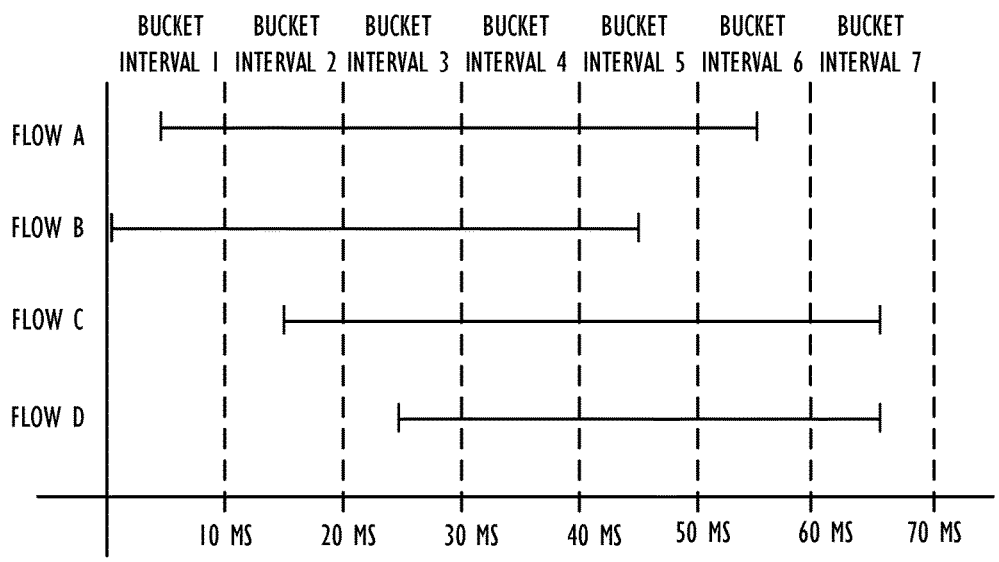
FIG. 12 is a timing diagram of an embodiment of average data rates for a plurality of flows traversing a specific network port and/or link.

FIG. 12 is a timing diagram of an embodiment of average data rates for a plurality of flows traversing a specific network port and/or link. Recall that the analytics and diagnostic node uses the number of transmitted data frames and latency metrics to determine an average data rate for each monitored flow. Each of the flows transport data frames over the specific network port and/or link at different times within the evaluation time period. In FIG. 12, for an evaluation time period of about 70 ms, flow A transports data frames from about 5 ms to about 55 ms; flow B transports data frames from about 0 ms to about 45 ms; flow C transports data frames from about 15 ms to about 65 ms; and flow D transports data frames from about 25 ms to about 65 ms. Each of the flows transports data frames at the same or different average data rates. Additionally, the about 70 ms evaluation time period may be divided into about seven bucket intervals, where each of the bucket intervals is about 10 ms long. For example, the first bucket interval is from 0 ms to about 10 ms and the second bucket interval is from about 10 ms to about 20 ms. Other embodiments may select different time periods for the bucket intervals depending on the network operator's desired granularity in detecting for oversubscription.

The average data rates for each flow are summed to determine the cumulative data rate for each of the bucket intervals. Using FIG. 12 as an example, for the first bucket interval, the cumulative data rate is equal to the sum of the average data rates for flow A and flow B. For the second bucket interval, the cumulative data rate is equal to the sum of the average data rates for flow A, flow B, and flow C. After determining the cumulative data rates for each of the bucket intervals, the cumulative data rates are compared with one or more oversubscription rules. In one embodiment, the oversubscription rule is a threshold value set by a network operator and/or the threshold value derived from one or more network parameters set by the network operator. In this instance, oversubscription is detected if the cumulative data rates for any of the bucket intervals are greater than or equal to the threshold value. Other embodiments may use other types of oversubscription rules to detect for oversubscription based on the cumulative data rates of each bucket interval.

Figure 13:
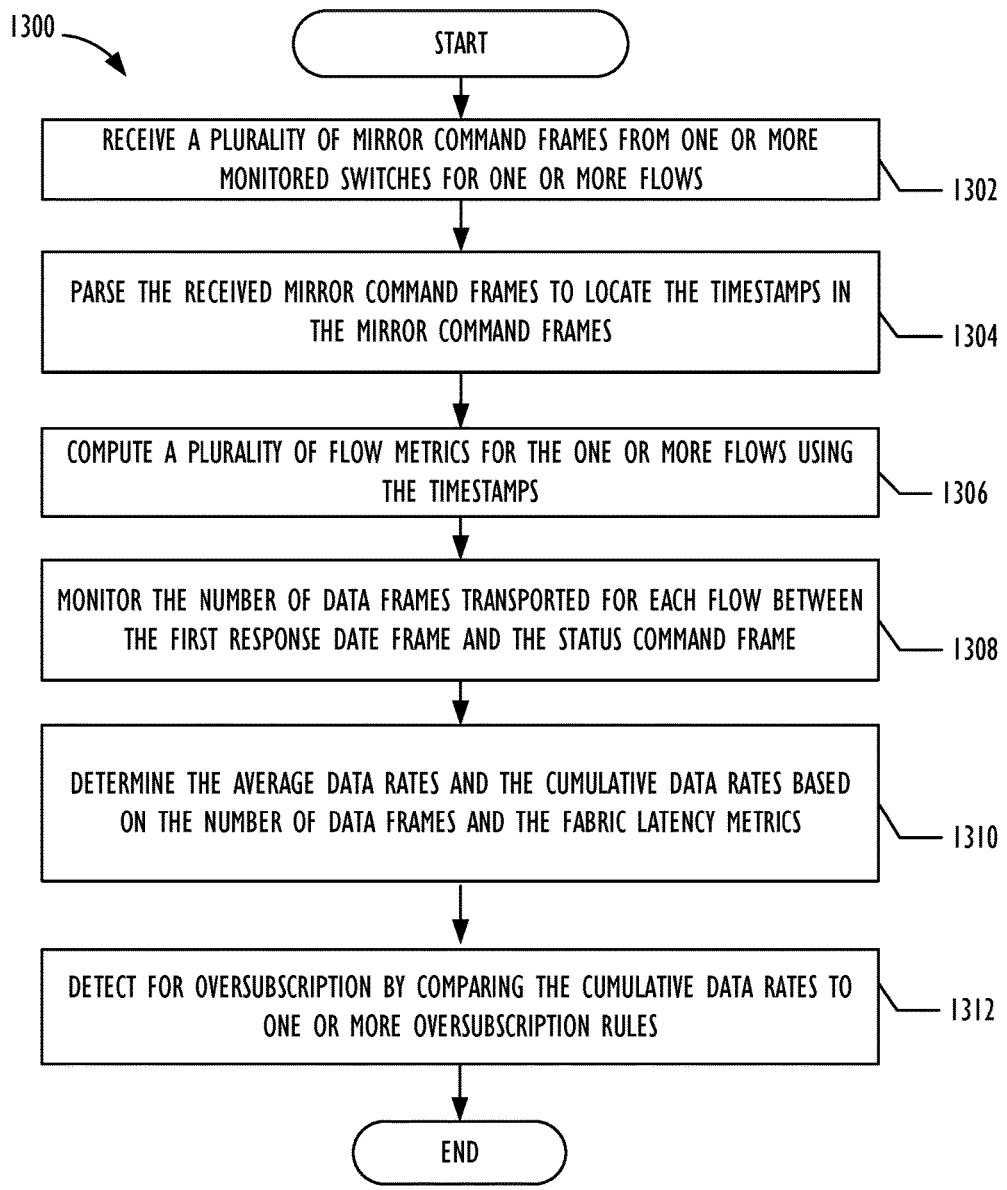
FIG. 13 is a flow chart of an embodiment of method used to detect for oversubscription and measure a variety of latency metrics.

FIG. 13 is a flow chart of an embodiment of method 1300 used to detect for oversubscription and measure a variety of flow metrics, such as performance metrics and latency metrics. Using FIGS. 1-4 as an example, method 1300 is implemented using an analytics and diagnostic node as described above (e.g., analytics and diagnostic 110, 310, 404, and 500). Method 1300 could be implemented to monitor one or more different network fabrics and for any network port and/or link within a network fabric. For example, method 1300 is used to monitor F-N port links located between end nodes and edge switches. Additionally or alternatively, method 1300 is used to measure data throughput for one or more flows for an ISL link located between two switches.

Method 1300 starts at block 1302 by the analysis and diagnostic node receiving a plurality of mirror command frames from one or more monitored switches for one or more flows. The mirror command frames each comprise a timestamp that indicates when the monitored switch receives the command frame. Method 1300 then moves to block 1304 and parses the received mirror command frame and extracts the timestamps in the mirror command frame. Recall that the timestamps are located within the mirror header 606 and can be extracted when analyzing the mirror header 606, for example, at the FC logic switch 504 within the analytics and diagnostic node 500. Monitored switches insert the timestamps when generating the mirror command frames. Method 1300 continues to block 1306 and computes a plurality of flow metrics, such as performance metrics and latency metrics, based on the received timestamps. Tables 1 and 2 provide a list of example flow metrics computed by method 1300 and/or obtained at block 1306. Specific to read and write commands, method 1300 computes a variety of latency metrics, such as initiator/target exchange completion times, initiator/target first response latency times, command frame latency, first response frame latency, and the status frame latency. In regards to monitoring oversubscription, method 1300 specifically determines the data transfer time, which is the time difference of the first response latency time and the exchange completion times.

Method 1300 continues to block 1308 and also monitors the numbers of data frames transported for each flow between the first response data frame and the status command data frame. For read and write commands, the number of data frames represents the number of read or write data frames sent after the first response frame and before the status command frame for each flow. Method 1300 then moves to block 1310 and determines the average data rates and the cumulative data rates based on the number of data frames for each of the series of bucket intervals, as described above. Determining the average data rate and cumulative date rate were discussed in more detail in FIG. 12. Method 1300 then proceeds to block 1312 and detects for oversubscription by comparing the cumulative data rates to one or more oversubscription rules. For example, the cumulative data rates are compared to a threshold value, where oversubscription occurs when the cumulative data rate meets or exceeds the threshold value.

In one embodiment, method 1300 may also determine fabric latency values by performing blocks 1302, 1304, and 1306 for mirror command frames from the initiator and target-connected monitored switches. Method 1300 may then perform computations at an additional block as described above for FIGS. 9-11.

As described above, the disclosure includes various example embodiments to monitor one or more flows within one or more fabric networks in real-time in order to provide visibility into network performance. By receiving mirror command frames from one or more monitored switches within a flow, an analytics and diagnostic node is able to provide device-level performance information related to specific hosts, targets, LUNs, and identify links and/or specific device ports that are causing potential fabric issues. For each monitored flow, the analytics and diagnostic node monitors one or more network ports and/or links to determine times corresponding to one or more command frames, performance metrics, and/or one or more latency metrics. For example, the analytics and diagnostic node is able to the compute latency metrics that include initiator exchange completion time, target exchange completion time, an initiator first response latency time, and the target first response latency time. The analytics and diagnostic node is also able to determine the number of data frames (e.g., non-command frames) transported over the network ports and/or the links for each monitored flow over a specified time period. Based on these metrics, the analytics and diagnostic node is able to not only track network performance, but also identify potential failures, such as oversubscription. Additionally, the analytics and diagnostic node provides an easily scalable and transparent monitoring system that obtains the different metrics in such a manner to avoid disrupting the network and/or slowing down one or more network devices (e.g., loading down the CPU in switches).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about to includes, 2, 3, 4, etc.; greater than 0.10 includes 0.11, 0.12, 0.13, etc.). The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of.

The above description is intended to be illustrative, and not restrictive. For example, the above-described embodiments may be used in combination with each other. Many other embodiments will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An apparatus comprising:
a first network port configured to receive a first mirror operational command frame and a first mirror return command frame associated with the first mirror operational command frame from a first monitored switch coupled to an initiator end node, wherein the first mirror operational command frame includes a first timestamp indicative of a time associated with receiving an operational command frame at the first monitored switch and a first copy of at least a portion of the operational command frame, and wherein the first mirror return command frame includes a second timestamp indicative of a time associated with receiving a return command frame at the first monitored switch and a first copy of at least a portion of the return command frame;
a second network port configured to receive a second mirror operational command frame and a second mirror return command frame associated with the second mirror operational command frame from a second monitored switch coupled to a target end node, wherein the second mirror operational command frame includes a third timestamp indicative of a time associated with receiving the operational command frame at the second monitored switch and a second copy of at least a portion of the operational command frame, and wherein the second mirror return command frame includes a fourth timestamp indicative of a time associated with receiving the return command frame at the second monitored switch and a second copy of at least a portion of the return command frame; and at least one programmable control device coupled to the first network port and the second network port and configured to:
extract the first timestamp from the first mirror operational command frame and the second timestamp from the first mirror return command frame;
extract the third timestamp from the second operational command frame and the fourth timestamp from the second operational command frame; and
determine an initiator time to complete a relevant command operation as being from the first timestamp and the second timestamp;
determine a target time to complete the relevant command operation as being from the third timestamp and the fourth timestamp; and
determine a relevant fabric latency as being the difference between the initiator time to complete the command operation and the target time to complete the command operation,
wherein the relevant command operation is associated with a flow for the initiator end node and target end node.

2. The apparatus of claim 1, wherein the return command frame is a first response command frame from the target end node of the flow after the target end node receives the operational command frame.

3. The apparatus of claim 2, wherein the initiator time to complete the relevant command operation is a first response time that accounts for an elapsed amount of time between the first monitored switch receiving the operational command frame and receiving the first response command frame, and wherein the target time to complete the relevant command operations is a first response time that accounts for an elapsed amount of time between the second monitored switch receiving the operational command frame and receiving the first response command frame.

4. The apparatus of claim 1, wherein the return command frame is a status command frame from the target end node of the flow after the target end node receives the operational command frame and completes the operational command.

5. The apparatus of claim 4, wherein the initiator time to complete the relevant command operation is an exchange completion time that accounts for an elapsed amount of time between the first monitored switch receiving the operational command frame and receiving the status command frame, and wherein the target time to complete the relevant command operations is an exchange completion time that accounts for an elapsed amount of time between the second monitored switch receiving the operational command frame and receiving the status command frame.

6. A network comprising:
a first monitored node including a first plurality of network ports coupled to a programmable control device, wherein the first monitored node is coupled to an initiator end node and is configured to:
receive an operational command frame at a first network port of the first plurality of network ports and a return command frame associated with the operational command frame at a second network port of the first plurality of network ports, wherein the operational command frame and the return command frame correspond to a command operation associated with a flow between the initiator end node and a target end node;
generate a first mirror operational command frame based on the operational command frame, wherein the first mirror operational command frame includes a first timestamp that indicates a time associated with receiving the operational command frame and a first copy of at least a portion of the operational command frame;
generate a first mirror return command frame based on the return command frame, wherein the first mirror return command frame includes a second timestamp that indicates a time associated with receiving the return command frame and a first copy of at least a portion of the return command frame; and
transmit the first mirror operational command frame and the first mirror return command frame over a third network port of the first plurality of network ports;
a second monitored node including a second plurality of network ports coupled to a programmable control device, wherein the second monitored node is coupled to the target end node and configured to:
receive the operational command frame at a first network port of the second plurality of network ports and the return command frame associated with the operational command frame at a second network port of the second plurality of network ports;
generate a second mirror operational command frame based on the operational command frame, wherein the second mirror operational command frame includes a third timestamp that indicates a time associated with receiving the operational command frame and a second copy of at least a portion of the operational command frame;
generate a second mirror return command frame based on the return command frame, wherein the second mirror return command frame includes a fourth timestamp that indicates a time associated with receiving the return command frame and a second copy of at least a portion of the return command frame; and
transmit the second mirror operational command frame and the second mirror return command frame over a third network port of the second plurality of network ports;
an analytics and diagnostic node including a fourth network port and a fifth network port that are coupled to at least one programmable control device;
a first link connected to the third network port of the first plurality of network ports and the fourth network port; and
a second link connected to the third network port of the second plurality of network ports and the fifth network port,
wherein the at least one programmable control device is configured to:
extract the first timestamp from the first mirror operational command frame and the second timestamp from the first mirror return command frame;
extract the third timestamp from the second mirror operational command frame and the fourth timestamp from the second mirror return command frame; and
determine an initiator time to complete the command operation based on the first timestamp and the second timestamp;
determine a target time to complete the command operation based on the third timestamp and the fourth timestamp; and determine a fabric latency based on the difference between the initiator time to complete the command operation and the target time to complete the command operation.

7. The network of claim 6, wherein the return command frame is a first response command frame from the target end node of the flow after the target end node receives the operational command frame.

8. The network of claim 7, wherein the initiator time to complete the command operation is a first response time that accounts for an elapsed amount of time between the first monitored node receiving the operational command frame and receiving the first response command frame, and wherein the target time to complete the command operations is a first response time that accounts for an elapsed amount of time between the second monitored switch receiving the operational command frame and receiving the first response command frame.

9. The network of claim 6, wherein the return command frame is a status command frame from the target end node of the flow after the target end node receives the operational command frame and completes the operational command.

10. The network of claim 9, wherein the initiator time to complete the command operation is an exchange completion time that accounts for an elapsed amount of time between the first monitored switch receiving the operational command frame and receiving the status command frame, and wherein the target time to complete the t command operations is an exchange completion time that accounts for an elapsed amount of time between the second monitored switch receiving the operational command frame and receiving the status command frame.

11. A method, comprising:
receiving a first mirror operational command frame and a first mirror return command frame associated with the first mirror operational command frame from a first monitored switch coupled to an initiator end node, wherein the first mirror operational command frame includes a first timestamp indicative of a time associated with receiving an operational command frame at the first monitored switch and a first copy of at least a portion of the operational command frame, and wherein the first mirror return command frame includes a second timestamp indicative of a time associated with receiving a return command frame at the first monitored switch and a first copy of at least a portion of the return command frame;
receiving a second mirror operational command frame and a second mirror return command frame associated with the second mirror operational command frame from a second monitored switch coupled to a target end node, wherein the second mirror operational command frame includes a third timestamp indicative of a time associated with receiving the operational command frame at the second monitored switch and a second copy of at least a portion of the operational command frame, and wherein the second mirror return command frame includes a fourth timestamp indicative of a time associated with receiving the return command frame at the second monitored switch and a second copy of at least a portion of the return command frame;
parsing the first mirror operational command frame to extract a first timestamp;
parsing the first mirror return command frame to extract a second timestamp;
parsing the second mirror operational command frame to extract a third timestamp;
parsing the second mirror return command frame to extract a fourth timestamp;
determining an initiator time to complete a relevant command operation as from the first timestamp and the second timestamp;
determining a target time to complete the relevant command operation as from the third timestamp and the fourth timestamp; and
determining a relevant fabric latency as from the difference between initiator time to complete the relevant command operation and the target time to complete the relevant command operation,
wherein the relevant command operation is associated with a flow for the initiator end node and target end node.

12. The method of claim 11, wherein the return command frame is a first response command frame from the target end node of the flow after the target end node receives the operational command frame.

13. The method of claim 12, wherein the initiator time to complete the relevant command operation is a first response time that accounts for an elapsed amount of time between the first monitored switch receiving the operational command frame and receiving the first response command frame, and wherein the target time to complete the relevant command operations is a first response time that accounts for an elapsed amount of time between the second monitored switch receiving the operational command frame and receiving the first response command frame.

14. The method of claim 12, wherein the return command frame is a status command frame from the target end node of the flow after the target end node receives the operational command frame and completes the operational command.

15. The method of claim 14, wherein the initiator time to complete the relevant command operation is an exchange completion time that accounts for an elapsed amount of time between the first monitored switch receiving the operational command frame and receiving the status command frame, and wherein the target time to complete the relevant command operations is an exchange completion time that accounts for an elapsed amount of time between the second monitored switch receiving the operational command frame and receiving the status command frame.

* * * * *